United States Patent
Lawrence et al.

(10) Patent No.: US 6,217,763 B1
(45) Date of Patent: *Apr. 17, 2001

(54) BACK-FLUSHABLE FILTER CARTRIDGE ASSEMBLIES

(75) Inventors: Dianna L. Lawrence, Essex; Brian M. Raab, Baltimore; Carolyn A. Williams, Sykesville; Carl H. Hohenberger, Westminster, all of MD (US)

(73) Assignee: USF Filtration and Separation Group, Inc., Timonium, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,045

(22) Filed: Aug. 11, 1999

(51) Int. Cl.[7] .................................................. B01D 29/21
(52) U.S. Cl. ....................... 210/232; 210/460; 210/483; 210/489; 210/497.01; 210/DIG. 17
(58) Field of Search ..................................... 210/232, 238, 210/315, 317, 323.2, 335, 342, 437, 483, 489, 497.01, 497.2, 460, DIG. 17

(56) References Cited

U.S. PATENT DOCUMENTS

| 4,108,775 | * | 8/1978 | Wilkes et al. . |
| 4,683,057 | * | 7/1987 | Krause et al. . |
| 4,871,455 | * | 10/1989 | Terhune et al. . |
| 5,045,192 | | 9/1991 | Terhune ............................. 210/232 |
| 5,190,651 | * | 3/1993 | Spencer et al. . |
| 5,211,846 | * | 5/1993 | Kott et al. . |
| 5,259,953 | * | 11/1993 | Baracchi et al. . |
| 5,279,733 | * | 1/1994 | Heymans . |
| 5,567,323 | * | 10/1996 | Harrison, Jr. . |
| 5,681,461 | * | 10/1997 | Gullett et al. . |
| 5,984,109 | * | 11/1999 | Kanwar et al. . |
| 6,096,207 | * | 8/2000 | Hoffman, Jr. et al. . |

FOREIGN PATENT DOCUMENTS 0 528 528 A1     2/1993   (EP) .

* cited by examiner

Primary Examiner—David A. Simmons
Assistant Examiner—Fred Prince
(74) Attorney, Agent, or Firm—Nixon & Vanderhye P.C.

(57) ABSTRACT

Filter cartridge assemblies are provided with a generally cylindrical filter medium which defines a cylindrically shaped core space, and a pair of end caps. A threaded base member having detent projections receives at least one of the end caps, which itself is annular and has an interior cylindrical surface defining an interior space in alignment with the core space. The interior space is also provided with interrupted threads defining detent spaces. In use, therefore, the lower end cap may be threadably coupled with the threaded base member such that the detent projections are seated in respective ones of the detent, thereby minimizing the unintended threaded uncoupling therebetween. In another aspect, the filter cartridge is most preferably "coreless" and is capable of being sleeved over a permanent, reusable perforated core element. However, the core element is removably insertable within a base member to which the filter cartridge may be coupled. Specifically, one end of the core element is provided with an annular set ring. The set ring is rigidly connected to the exterior surface in surrounding relationship to the core element at a location spaced axially from the one of its ends (e.g., the lower end) towards the other end (e.g., the upper end). In use, the annular set ring provides a seat which bears against the base when the end of the core element is forcibly inserted thereinto.

25 Claims, 3 Drawing Sheets

BACK-FLUSHABLE FILTER CARTRIDGE ASSEMBLIES

FIELD OF THE INVENTION

Figure 1:
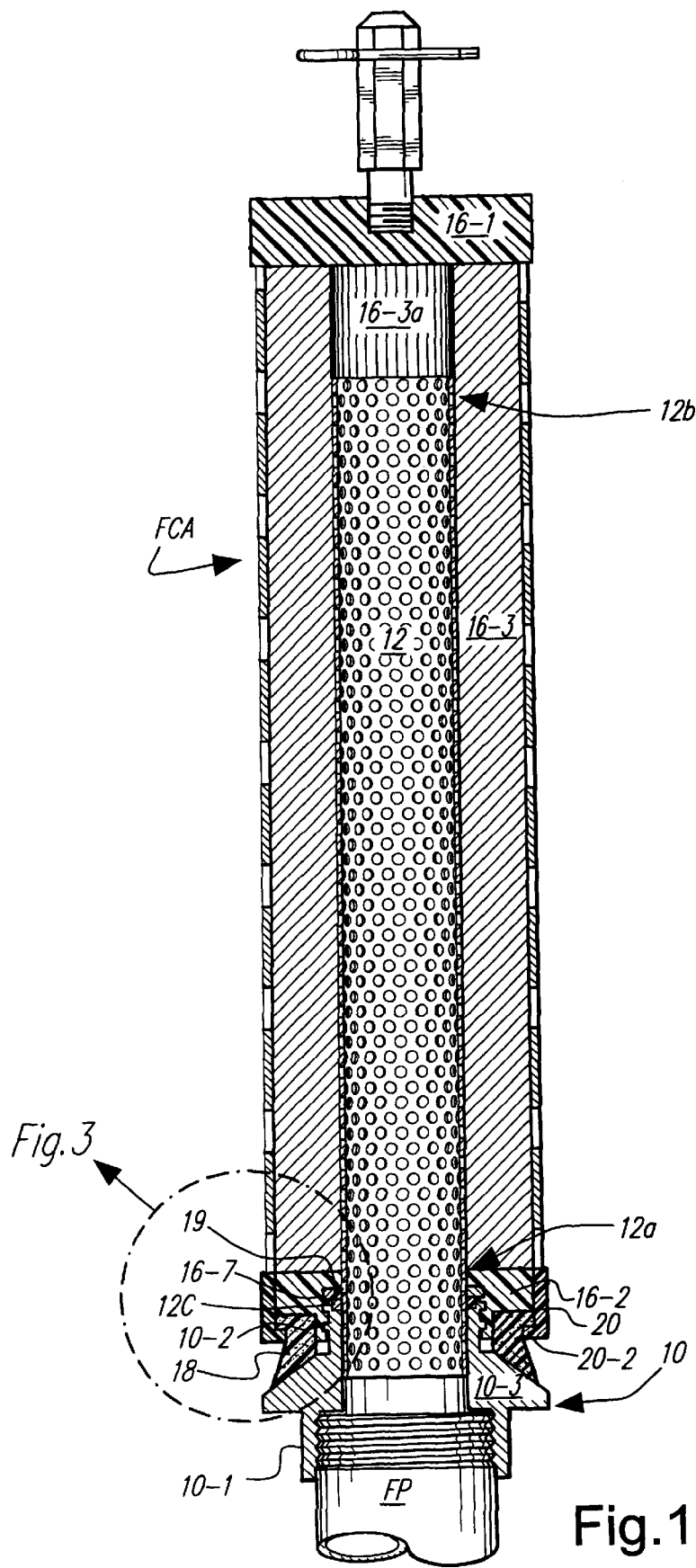

The present invention relates generally to the field of filter cartridges. In preferred forms, the present invention relates to filter cartridge assemblies which are especially useful for process applications requiring periodic back-flushing.

BACKGROUND AND SUMMARY OF THE INVENTION

Disposable filter cartridges are widely used for the filtration of a variety of fluids. Generally, such filter cartridges include cylindrically shaped filter media which define a central core chamber. The filter medium is typically provided with appropriate end caps which allow fluid to be forced through the depth of the filter media. Some filter cartridges (e.g., as depicted in FIG. 4 of U.S. Pat. No. 5,681,469) are provided with an integral rigid core structure which provides the filter media with structural support (e.g., so the filter medium is capable of withstanding fluid pressure differentials during use). Other filter cartridges, as shown, for example, in U.S. Pat. No. 5,399,264, employ a relatively rigid, self-supporting, porous, thick-walled tubular filter cartridge element having specially designed flexible end caps. Still other filter cartridges, such as those depicted in U.S. Pat. Nos. 4,218,324 and 5,681,461 employ a "coreless" disposable filter cartridge having rigid preformed end caps. The coreless disposable filter cartridge is sleeved over, and fluid-sealed with respect to, a reusable separate core structure.

Recently, improvements in the so-called "coreless" filter cartridges were proposed by copending U.S. patent application Ser. No. 09/154,522 filed on Sep. 16, 1998 (the entire content of which is incorporated expressly hereinto by reference, and hereinafter referred to as "the '522 application"). In general, the filter cartridge disclosed in the '522 application includes a generally cylindrical filter medium which defines a cylindrically shaped core space, and a pair of rigid, preformed end caps fixed to opposite ends of the filter medium. At least one of the end caps (e.g., the lower end cap) is annular and has an interior cylindrical surface defining an interior space in alignment with the filter cartridge's core space. A truncated generally conically shaped seal skirt is operatively associated with the annular end cap. The filter cartridge of the '522 application is sleeved over a reusable support core structure which includes a base having a truncated conically shaped seal skirt, and a tubular perforated rigid core element fixed at one end to the base. The annular end-cap and the base of the support core structure are removably mechanically coupled to one another, most preferably by being threadably interconnected. In such a manner, the seal skirt is sealingly engaged with the seal skirt of the base.

While the filter cartridge assemblies disclosed in '522 application represent novel improvements to the state of the art, some additional improvements may still be desired, especially in certain end-use applications. For example, in the power generation industry, large filter cartridge arrays housed within relatively large filtration vessels are typically needed in order to purify various process streams. These filter cartridge arrays typically use a guide rod to help center the core of an integral core/filter media cartridge. Once the cartridge is in place, they are secured to a top plate assembly (e.g., via a top stem and cotter pin arrangement). Needless to say, it is quite time consuming to replace all filter cartridges in a given filtration vessel leading to long equipment down times.

What has been needed, therefore, is an improved filter cartridge assembly which is especially adapted to be used in back-flushing filtration operations and/or which has the ability to be quickly removed. It is toward providing such needs that the present invention is directed.

Broadly, the present invention relates to improvements in filter cartridge assemblies whereby unintended threaded uncoupling between the filter cartridge and the base member may be minimized (if not eliminated entirely). More specifically, a filter cartridge assembly according to the present invention is provided with a generally cylindrical filter medium which defines a cylindrically shaped core space, and a pair of end caps fixed to opposite ends of the filter medium. A threaded base member having detent projections receives at least one of the end caps, most preferably the lower end cap. This lower end cap is annular and has an interior cylindrical surface defining an interior space in alignment with the core space. The interior space is also provided with interrupted threads defining detent spaces.

In use, therefore, the lower end cap may be threadably coupled with the threaded base member such that the detent projections are seated in respective ones of the detent spaces. In such a manner, the unintended threaded uncoupling of the lower end cap and the base member is minimized.

In another aspect of this invention, the filter cartridge is most preferably "coreless" and is capable of being sleeved over a permanent, reusable perforated core element. However, the core element is removably insertable within a base member to which the filter cartridge may be coupled. Specifically, one end of the core element is provided with an annular set ring. The set ring is rigidly connected to the exterior surface in surrounding relationship to the core element at a location spaced axially from the one of its ends (e.g., the lower end) towards the other end (e.g., the upper end). In use, the annular set ring provides a seat which bears against the base when the end of the core element is forcibly inserted thereinto.

These and other aspects and advantages of the present invention will become more clear after careful consideration is given to the following detailed description of the preferred exemplary embodiments thereof which follow.

BRIEF DESCRIPTION OF THE ACCOMPANYING DRAWINGS

Figure 2:
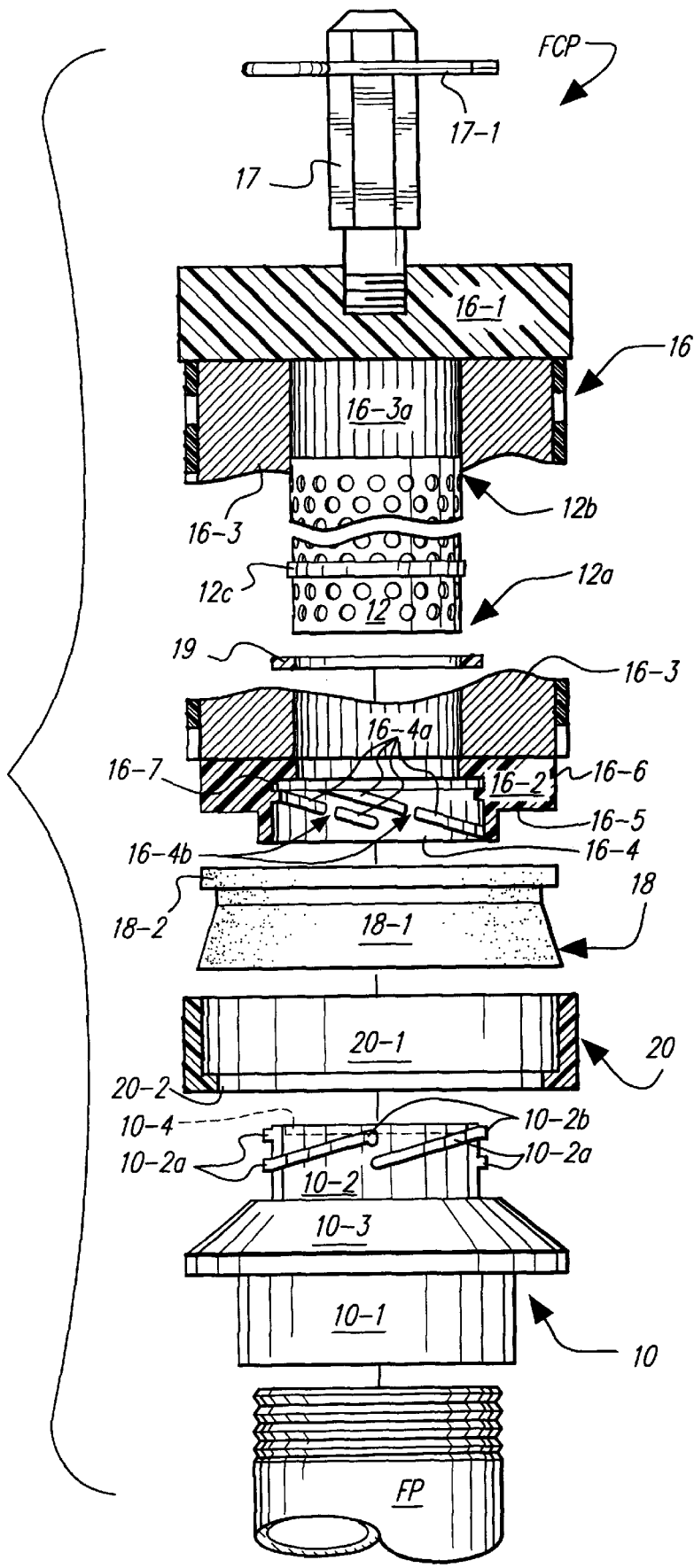
Figure 3:
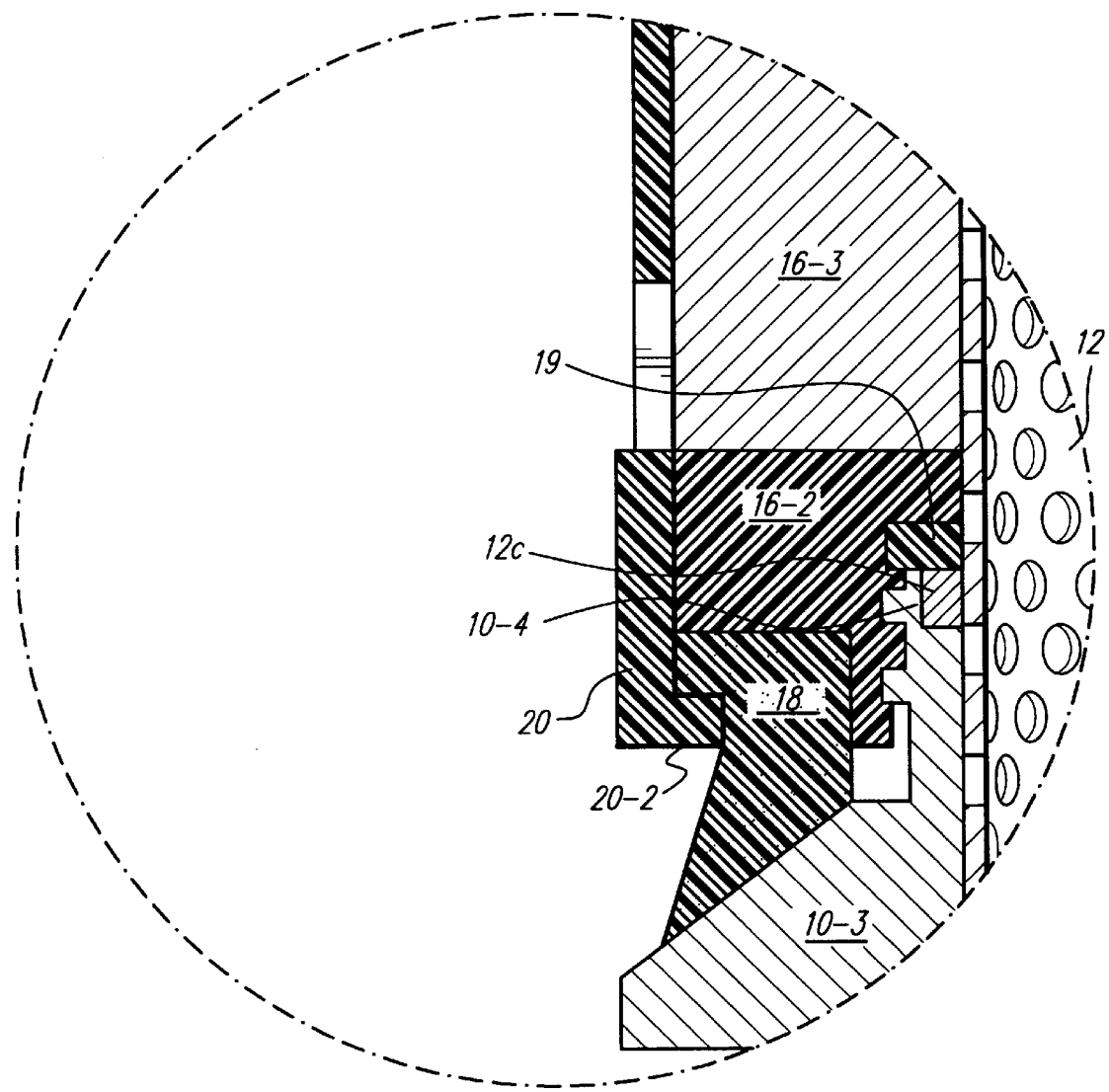

Reference will hereinafter be made to the accompanying drawings wherein like reference numerals throughout the various FIGURES denote like structural elements, and wherein, FIG. 1 is a cross-sectional elevational view showing one preferred filter cartridge assembly in accordance with the present invention;

FIG. 2 is an enlarged cross-sectional view of the filter cartridge assembly depicted in FIG. 1, but shown in an exploded arrangement; and FIG. 3 is an enlarged cross-sectional view of the base region of the filter cartridge assembly as identified in FIG. 1.

DETAILED DESCRIPTION OF THE INVENTION

The filter cartridge assembly FCA depicted in accompanying FIGS. 1 and 2 generally includes a rigid metal base member 10 which removably receives in a friction fit manner one end 12a of an elongate perforated tubular metal core 12. A cylindrical filter cartridge 16 may be sleeved over the tubular core 12 and threadably coupled to the base 10 in a manner to be described below.

The tubular metal core 12 is most preferably made by helically winding a perforated metal sheet and rigidly joining the abutted or overlapped edges (e.g., via soldering, welding or the like) to form a rigid tubular structure of indefinite length. The tubular structure may then be cut to desired lengths. In this regard, the other end 12b of the tubular core 12 opposite to the end joined to the base 10 is most preferably provided with a slightly inwardly rounded or chamfered edge region to more easily allow filter cartridges to be sleeved thereover during use.

An annular set ring 12c is rigidly attached in surrounding relationship to the core 12 at a location spaced axially from the one end 12a towards the other end 12b. In use, the annular set ring 12c provides a seat which bears against the base 10 when the end 12a of the core 12 is forcibly inserted thereinto.

The base 10 is integrally provided with a seat boss 10-1 at one end, a threaded connection boss 10-2 at the other end, and a concentrically disposed seal flange 10-3 disposed therebetween. The internal cylindrical space of the connection boss 10-2 is treaded so as to be capable of threaded union with a flow pipe FP adapted to carry filtrate from the core element 12 to another location in the process.

As is perhaps better seen in FIG. 2, the connection boss 10-2 is provided with discontinuous threads 10-2a which serve to provide a one-quarter turn coupling between the filter cartridge 16 and the base 10. The interrupted threads 10-2a include at their respective upper extents a detent 10-2b which protrudes downwardly as viewed in FIG. 2, the purpose of which will be explained in greater detail below.

The filter cartridge 16 includes a pair of preformed rigid end-caps 16-1, 16-2 positionally holding therebetween a cylindrically shaped, tubular filter body 16-3 which, in the preferred form, is a conventional pleated filter medium. Other filter media may also be employed, such as filter media formed of a non-woven melt-spun fibrous mass and/or sheets, foam or other porous filter media and the like.

The upper end-cap 16-1 is most preferably solid (i.e., non-apertured) so that fluid passing through the filter body 16-3 will be directed into the central hollow bore 16-3a thereof. In addition, the upper end cap 16-1 includes an upwardly projecting mounting post 17 which is coupled thereto and projects outwardly therefrom. The mounting post 17 is adapted, in turn, to be operatively joined to a retainer plate associated with a filtration vessel or housing (not shown) in which the filter cartridge assembly FCA is used, and can be removably coupled thereto by means of, for example, cotter pin 17-1.

The lower end-cap 16-2, on the other hand, defines a threaded bore 164 in coaxial alignment with the central bore 16-3a of the filter body 16-3. Importantly, the extent of the threads 16-4a formed within the bore 16-4 are interrupted so as to form spaces 16-4b.

A flexible elastomeric seal 18 is provided and formed of a suitable elastomeric material, e.g., a synthetic rubber or like material, which is compatible with the filtering conditions and fluid. Structurally, the seal 18 includes a depending truncated cylindrically shaped seal flange 18-1 which is conformably shaped to the cylindrical seal skirt 10-3 of the base 10. An annular connection lip 18-2 extends outwardly away from the seal flange 18-1 and is most preferably formed as a unitary structure therewith. The connection lip 18-2 is sized so as to be seated within the annular ledge surface 16-5 of the end-cap 16-2.

A secondary annular elastomeric seal 19 is seated in groove 16-7 and seals against the upper edges of the connection boss 10-2 and the seat ring 12c (see FIG. 3). The presence of the seal 19 and its contact with the upper edges of the connection boss 10-2 and the seat ring 12c thereby serves as a back-up seal to seal 18 during a backflush cycle.

An annular retaining ring 20 is provided so as to be in close conformity with the exterior side surface 16-6 of the end-cap 16-2 and thus be in friction fit relationship therewith. As shown, the retaining ring 20 has an interior wall 20-1 which is friction fit over the exterior surface of the end-cap 16-2, and an inwardly projecting retaining wall 20-2. The retaining wall 20-2 of the retaining ring 20 will thus removably retain the connection lip 18-2 within the ledge surface 16-5.

In use, the base 10 will most preferably be threaded onto the flow pipe FP associated within a filtration vessel (not shown) prior to initial installation. Thereafter, the base 10 may be left in place within the filtration vessel.

During an installation procedure, the filter cartridge 16 is sleeved over the core element 12 until contact is made between the set ring 12c and the end cap 16-2. As such, the entire core 12 and filter cartridge 16 may be handled as a unit and placed in the proper location within the filtration vessel in alignment with a base 10. Once aligned, the core 12 may be forcibly inserted into the cylindrical interior of the base 10 until contact is made between the set ring 12c and the inner recessed step 104 of the connection boss 10-2 (i.e., until the set ring 12c is seated within the recessed step 10-4).

Thereafter, relative turning movement may be applied between the cartridge 16 and threaded boss 10-2 so as to removably couple the cartridge 16 and the base 10. This relative turning movement, as noted previously, is most preferably about a one-quarter turn for ease of use. When the end cap 16-2 has been tightly threaded onto the boss 10-2, the detents 10-2b associated with the threads 10-2a will be received within respective ones of the spaces 16-4b defined by the interrupted threads 16-4a. This structural interaction between the detents 10-2b and spaces 16-4b will serve to minimize (if not prevent entirely) the threaded connection becoming loosened (i.e., due to reverse relative turning movements) during back-flushing operations.

As will be appreciated, once the end cap 16-2 has been threaded tightly onto the threaded boss 10-2 of the base 10, the sealing flange 18-2 will be forced responsively downwardly by virtue of the threaded connection between the end-cap 16-2 of the cartridge 16 and the threaded boss 10-2 of the base 10. The sealing flange 18-2 will thereby compressibly bear against the conformably shaped seal skirt 10-3 of the base 10.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A filter cartridge assembly comprising:
  a filter cartridge having a generally cylindrical coreless filter medium which defines a cylindrically shaped core space, and a pair of end caps fixed to opposite ends of said filter medium, and
  a threaded base member having detent projections; wherein at least one of said end caps is annular and has an interior cylindrical surface defining an interior space in alignment with said core space and provided with interrupted threads defining detent spaces, wherein said at least one end cap is threadably coupled with said threaded base member such that said detent projections are seated in respective said detent spaces to thereby minimize unintended threaded uncoupling of said at least one end cap and said base member; and wherein the filter cartridge assembly further comprises an elongate permanent reusable core element having a length of one end removably inserted into said base member; and wherein said core element includes an annular set ring coaxially rigidly fixed to, and axially spaced from, said one end thereof to establish said length when said one end of said core element is removably inserted into said base member and said set ring is seated against said base member.

2. The filter cartridge assembly as in claim 1, wherein the base member has an interior annular recessed step, said set ring being seated within said step.

3. The filter cartridge assembly as in claim 2, further comprising an annular seal which is in sealing contact with an upper edge of said base member and with said set ring.

4. A filter cartridge assembly comprising:
  a filter cartridge having a generally cylindrical filter medium which defines a cylindrically shaped core space, and a pair of end caps fixed to opposite ends of said filter medium, and
  a threaded base member having detent projections; wherein
  at least one of said end caps is annular and has an interior cylindrical surface defining an interior space in alignment with said core space and provided with interrupted threads defining detent spaces; wherein
  said at least one end cap is threadably coupled with said threaded base member such that said detent projections are seated in respective said detent spaces to thereby minimize unintended threaded uncoupling of said at least one end cap and said base member; and wherein
  said filter cartridge assembly further comprises a truncated generally conically shaped seal skirt operatively associated with said at least one of said end caps; wherein
  said base member includes a truncated conical base conformably shaped to said seal skirt, wherein said seal skirt is sealingly engaged with said base when said one end cap and said base are threadably coupled to one another.

5. A filter cartridge assembly as in claim 4, wherein said at least one end-cap includes an annular ledge, and wherein said seal skirt includes an outwardly extending connection lip which is seated on said ledge.

6. A filter cartridge assembly as in claim 5, further comprising a retaining ring which is coupled to said at least one end-cap for retaining said connection lip on said ledge.

7. A filter cartridge assembly as in claim 6, wherein said retaining ring has an L-shaped cross-section and is frictionally engaged with said at least one end-cap.

8. A filter cartridge assembly as in claim 1, wherein the other end cap, opposite to said one end cap, is a solid, non-apertured structure having a mounting post projecting outwardly therefrom.

9. A filter cartridge assembly comprising:
  a coreless filter cartridge having a generally cylindrical filter medium which defines a cylindrically shaped core space, and a pair of end caps fixed to opposite ends of said filter medium,
  a base member; and
  an elongate permanent reusable core element having a length of one end removably inserted into said base member, wherein
  said core element includes an annular set ring coaxially rigidly fixed to, and axially spaced from, said one end thereof to establish said length when said one end of said core element is removably inserted into said base member and said set ring is seated against said base member; wherein
  at least one of said end caps is annular and has an interior cylindrical surface defining an interior space in alignment with said core space and provided with interrupted threads defining detent spaces, and wherein
  said base member includes threads provided with detent projections; and wherein
  said at least one end cap is threadably coupled with said threaded base member such that said detent projections are seated in respective said detent spaces to thereby minimize unintended threaded uncoupling of said at least one end cap and said base member.

10. The filter cartridge assembly as in claim 12, further comprising a truncated generally conically shaped seal skirt operatively associated with said at least one of said end caps.

11. The filter cartridge assembly as in claim 10, wherein said base member includes a truncated conical base conformably shaped to said seal skirt, wherein said seal skirt is sealingly engaged with said base when said one end cap and said base are threadably coupled to one another.

12. A filter cartridge assembly as in claim 11, wherein said at least one end-cap includes an annular ledge, and wherein said seal skirt includes an outwardly extending connection lip which is seated on said ledge.

13. A filter cartridge assembly as in claim 12, further comprising a retaining ring which is coupled to said at least one end-cap for retaining said connection lip on said ledge.

14. A filter cartridge assembly as in claim 13, wherein said retaining ring has an L-shaped cross-section and is frictionally engaged with said at least one end-cap.

15. A filter cartridge assembly as in claim 9, wherein the other end cap, opposite to said one end cap, is a solid, non-apertured structure having a mounting post projecting outwardly therefrom.

16. A filter cartridge assembly comprising:
  a coreless filter cartridge having a generally cylindrical filter medium which defines a cylindrically shaped core space, and a pair of end caps fixed to opposite ends of said filter medium,
  a base member; and
  an elongate permanent reusable core element having a length of one end removably inserted into said base member, wherein
  said core element includes an annular set ring coaxially rigidly fixed to, and axially spaced from, said one end thereof to establish said length when said one end of said core element is removably inserted into said base member and said set ring is seated against said base member; wherein
  said base member has an interior annular recessed step, said set ring being seated within said step; and wherein
  said filter cartridge assembly further comprising an annular seal which is in sealing contact with an upper edge of said base member and with said set ring.

17. The filter cartridge assembly as in claim 16, further comprising a truncated generally conically shaped seal skirt operatively associated with said at least one of said end caps.

18. The filter cartridge assembly as in claim 17, wherein said base member includes a truncated conical base conformably shaped to said seal skirt, wherein said seal skirt is sealingly engaged with said base when said one end cap and said base are threadably coupled to one another.

19. A filter cartridge assembly as in claim 18, wherein said at least one end-cap includes an annular ledge, and wherein said seal skirt includes an outwardly extending connection lip which is seated on said ledge.

20. A filter cartridge assembly as in claim 19, further comprising a retaining ring which is coupled to said at least one end-cap for retaining said connection lip on said ledge.

21. A filter cartridge as in claim 20, wherein said retaining ring has an L-shaped cross-section and is frictionally engaged with said at least one end-cap.

22. A filter cartridge assembly comprising:

a filter cartridge having a generally cylindrical coreless filter medium which defines a cylindrically shaped core space, and a pair of end caps fixed to opposite ends of said filter medium, and a base member;

said base member including threads each provided at an upper terminal extent thereof with a downwardly protruding detent projection; wherein at least one of said end caps is annular and has an interior cylindrical surface defining an interior space in alignment with said core space and provided with interrupted threads, said interrupted threads having adjacent ends defining respective detent spaces therebetween, and wherein said at least one end cap is threadably coupled with said threaded base member such that said downwardly protruding detent projections at said upper extents of said threads are seated in respective said detent spaces to thereby minimize unintended threaded uncoupling of said at least one end cap and said base member.

23. The filter cartridge assembly of claim 22, further comprising:

an elongate permanent reusable core element having a length of one end removably inserted into said base member, wherein said core element includes an annular set ring coaxially rigidly fixed to, and axially spaced from, said one end thereof to establish said length when said one end of said core element is removably inserted into said base member and said set ring is seated against said base member.

24. The filter cartridge assembly of claim 23, wherein the base member has an interior annular recessed step, said set ring being seated within said step.

25. The filter cartridge assembly of claim 23 or 24, further comprising an annular seal which is in sealing contact with an upper edge of said base member and with said set ring.

* * * * *